(12) United States Patent
Hu et al.

(10) Patent No.: US 10,108,307 B1
(45) Date of Patent: Oct. 23, 2018

(54) GENERATION AND DISTRIBUTION OF DEVICE EXPERIENCE

(75) Inventors: Luhui Hu, Bothell, WA (US); Lian R. Garton, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 628 days.

(21) Appl. No.: 13/469,565

(22) Filed: May 11, 2012

(51) Int. Cl.
- G06F 3/0481 (2013.01)
- G06F 9/48 (2006.01)
- G06F 9/455 (2018.01)
- G06F 3/06 (2006.01)

(52) U.S. Cl.
CPC ......... *G06F 3/0481* (2013.01); *G06F 3/065* (2013.01); *G06F 9/455* (2013.01); *G06F 9/4843* (2013.01); *G06F 9/4868* (2013.01)

(58) Field of Classification Search
CPC ....... G06F 9/4443; G06F 3/0481; G06F 8/38; G06F 1/163; G06F 3/011; G06F 3/065; G06F 9/4868; G06F 9/484; G06F 9/4862
USPC ........................................ 715/744
See application file for complete search history.

(56) References Cited

U.S. PATENT DOCUMENTS

| | | | | |
|---|---|---|---|---|
| 5,786,814 A * | 7/1998 | Moran et al. | | 715/720 |
| 6,549,216 B1 * | 4/2003 | Schumacher | | G06F 9/45512 714/E11.193 |
| 7,269,645 B2 * | 9/2007 | Goh | | G06F 17/30864 707/E17.108 |
| 7,660,330 B1 * | 2/2010 | Shmilovici | | 370/503 |
| 8,863,095 B2 * | 10/2014 | Bharadwaj | | G06F 11/3414 717/127 |
| 2002/0104080 A1 * | 8/2002 | Woodard | | G06F 9/44505 717/176 |
| 2002/0111972 A1 * | 8/2002 | Lynch | | G06F 3/14 715/236 |
| 2003/0067485 A1 * | 4/2003 | Wong | | H04L 67/36 715/747 |
| 2003/0145071 A1 * | 7/2003 | Straut et al. | | 709/223 |
| 2003/0222903 A1 * | 12/2003 | Herzog | | G06Q 10/06 715/744 |
| 2004/0103274 A1 * | 5/2004 | Shih-Chieh | | G06F 9/4451 713/2 |
| 2005/0071187 A1 * | 3/2005 | Zubizarreta | | G06Q 10/10 715/704 |
| 2006/0168188 A1 * | 7/2006 | Dutton | | 709/223 |

(Continued)

OTHER PUBLICATIONS

Net Tips—use [field:NonSerialized] to stop serializing your event handlers, posted Dec. 17, 2011, retrieved from [theburningmonk.com] on [Feb. 5, 2017. 13 pages.].*

(Continued)

*Primary Examiner* — Amy M Levy
(74) *Attorney, Agent, or Firm* — Eversheds Sutherland (US) LLP

(57) ABSTRACT

User devices such as electronic book readers may be configured to provide a particular device experience. This device experience may comprise settings of a user interface, states of one or more applications or modules executing on the device, timing of events, and so forth. Settings, state information, timing, and so forth describing the device experience may be stored as an experience template. This experience template may be distributed to other user devices, allowing those other devices to experience the same or similar experiences.

19 Claims, 10 Drawing Sheets

(56) References Cited

U.S. PATENT DOCUMENTS

| | | | |
|---|---|---|---|
| 2007/0168956 A1* | 7/2007 | Moore | G06F 8/60 717/120 |
| 2007/0300174 A1* | 12/2007 | Macbeth et al. | 715/772 |
| 2008/0114830 A1* | 5/2008 | Welingkar | G06F 17/30575 709/203 |
| 2009/0017812 A1* | 1/2009 | Chan | G06F 8/62 455/419 |
| 2009/0063690 A1* | 3/2009 | Verthein | H04L 67/142 709/228 |
| 2009/0325630 A1* | 12/2009 | Tiitola | G06F 9/44505 455/550.1 |
| 2011/0004868 A1* | 1/2011 | Bharadwaj | 717/135 |
| 2011/0219105 A1* | 9/2011 | Kryze | G06F 15/16 709/223 |
| 2011/0225566 A1* | 9/2011 | Muharsky | G06F 11/3664 717/124 |
| 2011/0225569 A1* | 9/2011 | Beaty | G06F 11/3414 717/127 |
| 2011/0296303 A1* | 12/2011 | Duquene | H04L 67/1095 715/704 |
| 2012/0011439 A1* | 1/2012 | Karn | G06F 11/3414 715/704 |
| 2012/0131456 A1* | 5/2012 | Lin | G06F 9/4443 715/704 |
| 2012/0317133 A1* | 12/2012 | Cunningham | G06F 17/30722 707/769 |
| 2013/0019171 A1* | 1/2013 | Mounty | G06F 11/3688 715/704 |
| 2013/0181953 A1* | 7/2013 | Hinckley et al. | 345/179 |

OTHER PUBLICATIONS

Steven et al. jRapture: A Capture/Replay Tool for Observation-Based Testing. 2000 Intl. Symp. on Software Testing and Analysis, Portland, Oregon, Aug. 2000, pp. 158-167.*

Dictionary.com "replicate," in Dictionary.com Unabridged. Source location: Random House, Inc. http://www.dictionary.com/browse/replicate. Available: http://www.dictionary.com/. Accessed: Jan. 23, 2018 (Year: 2018).*

Dictionary.com "emulate," in Dictionary.com Unabridged. Source location: Random House, Inc. http://www.dictionary.com/browse/emulate. Available: http://www.dictionary.com/. Accessed: Jan. 23, 2018 (Year: 2018).*

* cited by examiner

GENERATION AND DISTRIBUTION OF DEVICE EXPERIENCE

BACKGROUND

A variety of user devices, such as electronic book ("e-Book") reader devices, desktop computers, portable computers, smartphones, tablet computers, and so forth are used to access various forms of electronic content.

Figure 1:
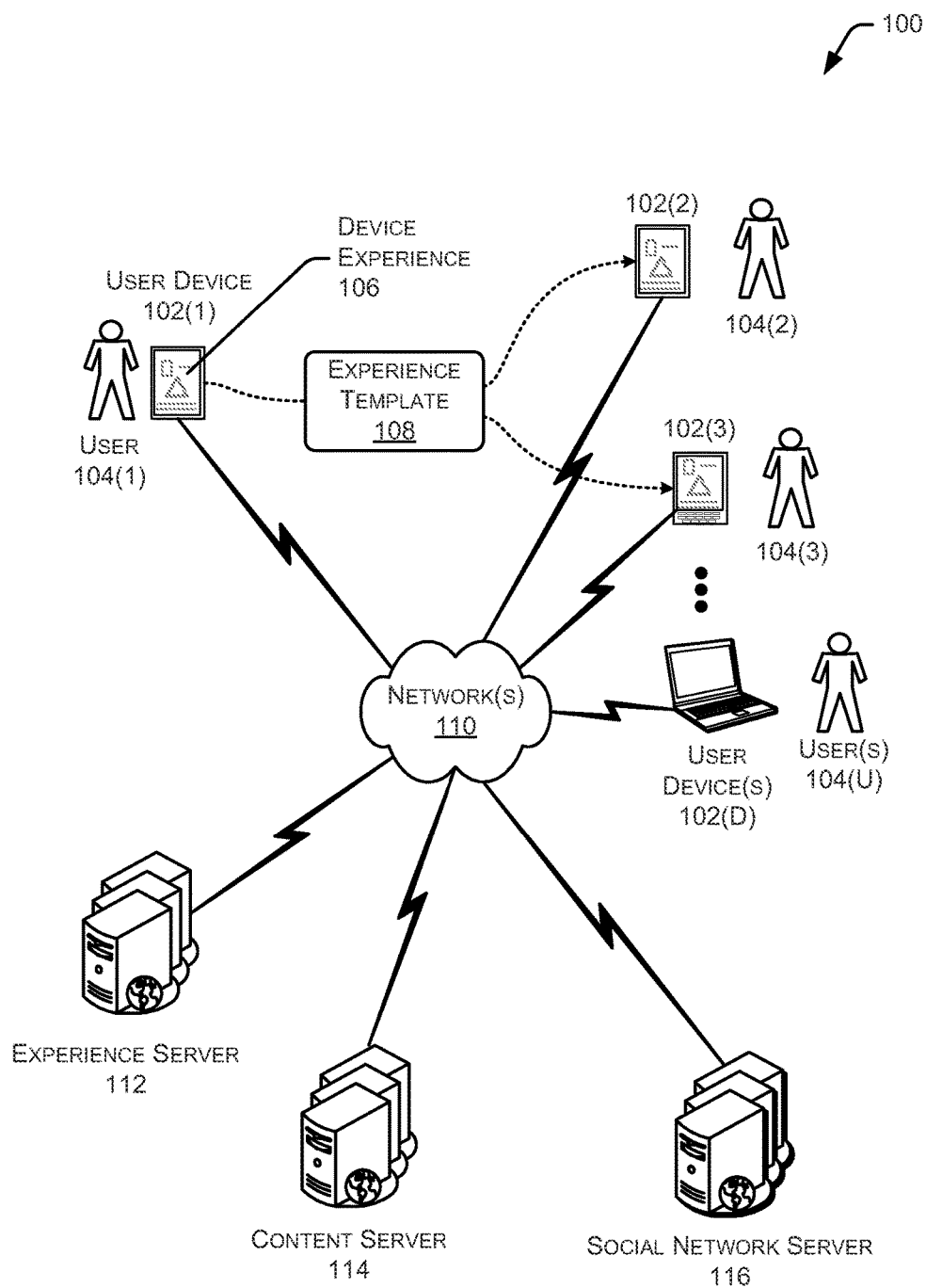
FIG. 1 illustrates a system for generating and distributing experience templates in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A variety of user devices, such as electronic book ("e-Book") reader devices, desktop computers, portable computers, smartphones, tablet computers, and so forth are used to access various forms of electronic content. As used in this disclosure, a device experience comprises one or more user preferences, user interface themes, network settings, application settings, states, interactions over time, and otherwise describes how a user and a user device interact or may interact.

Described in this disclosure are systems and methods for generating and sharing device experiences. Users may generate an experience template which encapsulates at least a portion of a particular device experience. That experience template may then be distributed, so that other users may use and benefit from the resulting device experience. These experience templates may be sold, leased, rented, given away, or otherwise commoditized.

The ability to create and share experience templates allows for various improvements to overall user experience. A user may share a particular device experience with their children to provide a common user experience and reduce or eliminate configuration efforts. A device experience may be configured to be implemented by the user device at certain times such as upon first boot, thus simplifying deployment and maintenance of the user device. Implementing the device experience may include storing, installing, executing, modifying, and so forth.

The experience template may also provide an interaction sequence. An interaction sequence comprises events such as changes to settings or states, made over time. The interaction sequence may be recorded and replayed. When replayed, the interaction sequence may be replayed in real-time, with pre-determined time interfaces, or as a set of operations or changes which are triggered by input, such as the user pressing a button. For example, a teacher may record an experience template that provides an interaction sequence that executes particular application modules on the user device to open in a particular order, accesses particular portions of an e-Book, plays back a video clip, presents a word processor for entry of notes by a student, and so forth.

Experience templates may be shared among different user devices. The experience templates may be translated, allowing them to be accessed from different user devices. For example, an experience template which is configured to accept keyboard input from a device with a keyboard may be reconfigured to allow implementation on a device which uses a touch screen instead of a keyboard.

Illustrative System

FIG. 1 illustrates a system 100 for generating and distributing experience templates. One or more user devices 102(1), 102(2), 102(3), . . . 102(D) may be used by one or more users 104(1), 104(2), 104(3), . . . 104(U). As used herein, letters enclosed by parenthesis such as "(U)" indicate an integer having a value greater than zero. The user devices 102 may include e-Book reader devices, laptops, desktops, tablet computers, televisions, set-top boxes, game consoles, and so forth. The user devices 102 are described in more detail below with regard to FIG. 2.

The user device 102 may be configured to present a particular device experience 106. The device experience 106 sets forth how the user device 102 operates and interacts with the user 104 and may comprise a particular combination or sequence of preferences, user interface themes, network settings, application settings, states, interactions over time, and so forth. An experience template 108 comprises data which describes the user device settings, state of application modules, user interface settings, interaction sequences, and so forth which produce the particular device experience 106. The experience template 108 is described in more detail below with regard to FIG. 4.

The user devices 102 may couple to a network 110. This coupling may be wired or wireless. The network 110 may include, but is not limited to, the Internet, a private network, a virtual private network, a wireless wide area network, a local area network, a metropolitan area network, a telephone network, and so forth. The network 110 may also be coupled to an experience server 112, a content server 114, a social network server 116, and other devices. The user devices 102 may exchange information with other user devices 102 or with the servers 112-116 via the network 110. This information may include experience templates 108.

The experience server 112 is configured to manage experience templates 108. This management may include generating, distributing, translating, and otherwise processing experience templates 108. The distribution may include selling, leasing, renting, providing at no charge, or otherwise providing the experience templates 108. The experience server 112, and other servers described herein may be implemented as one or more devices, as a cloud service, and so forth.

The experience server 112 may provide a user interface with which the users 104 may create or modify experience templates 108. The experience templates 108 may be created or modified without the user device 102. For example, the user 104(1) may purchase device 102(8) as a gift for another user 104(8). The user 104(1) may use a web interface of the experience server 112 to build a device experience 106(8) which is tailored to that user 104(8). The device experience 106(8) may comprise a custom screen saver image, favorite colors in the user interface, a particular language preference, an email client application configured in a particular way, and so forth. Upon receipt, the recipient user 104(8) may accept the experience template 108(8) and enjoy the device experience 106(8) created just for them.

The experience server 112 may also be configured to receive and store an experience template 108 generated by the user device 102. For example, the user 104(1) may configure their device to attain a particular device experience 106. Once configured, the device experience 106 may be provided as a corresponding experience template 108 to the experience server 112.

The experience server 112 may be configured to provide experience templates 108 to the user devices 102. In some implementations, the experience templates 108 may be distributed to all users 104, or to a subset of users 104. The experience server 112 may work in conjunction with one or more of the content server 114, the social network server 116, or other servers. The experience server 112 is discussed below in more detail with regard to FIG. 3.

The content server 114 is configured to provide content to one or more of the user devices 102. The content may comprise e-Books, Internet pages, audio, video, text, promotional messages, applications, and so forth. For example, a package of content may comprise an e-Book, a song track, and a video clip. In some implementations, the content may also include references to an experience template 108. Continuing the example, the package may refer to, or provide a link, to the experience template 108 as provided by the experience server 112.

The social network server 116 provides social networking services. These social networking services may include microblogging, maintaining social graphs describing inter-relationships between users, providing a distribution channel for one or more experience templates 108, and so forth. For example, a user 104(1) may share the experience template 108(1) with friends, such as the users 104(2) and 104(3). In other implementations, the user 104(1) may sell the experience template 108(1) to others.

The experience template 108 may be shared by the user 104(1) for use on other user devices 102. For example, the user 104(1) may have additional user devices 102(4) and 102(5). Rather than setting the device experience 106(1) to be the same on all the devices, the user 104(1) may create an experience template 108(1). By sharing this experience template 108(1) with the other devices 102(4) and 102(5) and implementing the experience template 108(1) on those devices, the same or similar device experience 106(1) is obtained across all three devices. Implementing the device experience may include storing, installing, executing, modifying, and so forth. As mentioned above, the device experience 106 may vary slightly due to differences between the user devices 102. For example, the user device 102(4) may lack a touch screen but may have a keyboard, while the user device 102(5) does not support a particular application. In such instances, the experience template 108 may be translated to allow for operation on user devices 102 which differ from that which originally generated the experience template 108.

Figure 2:
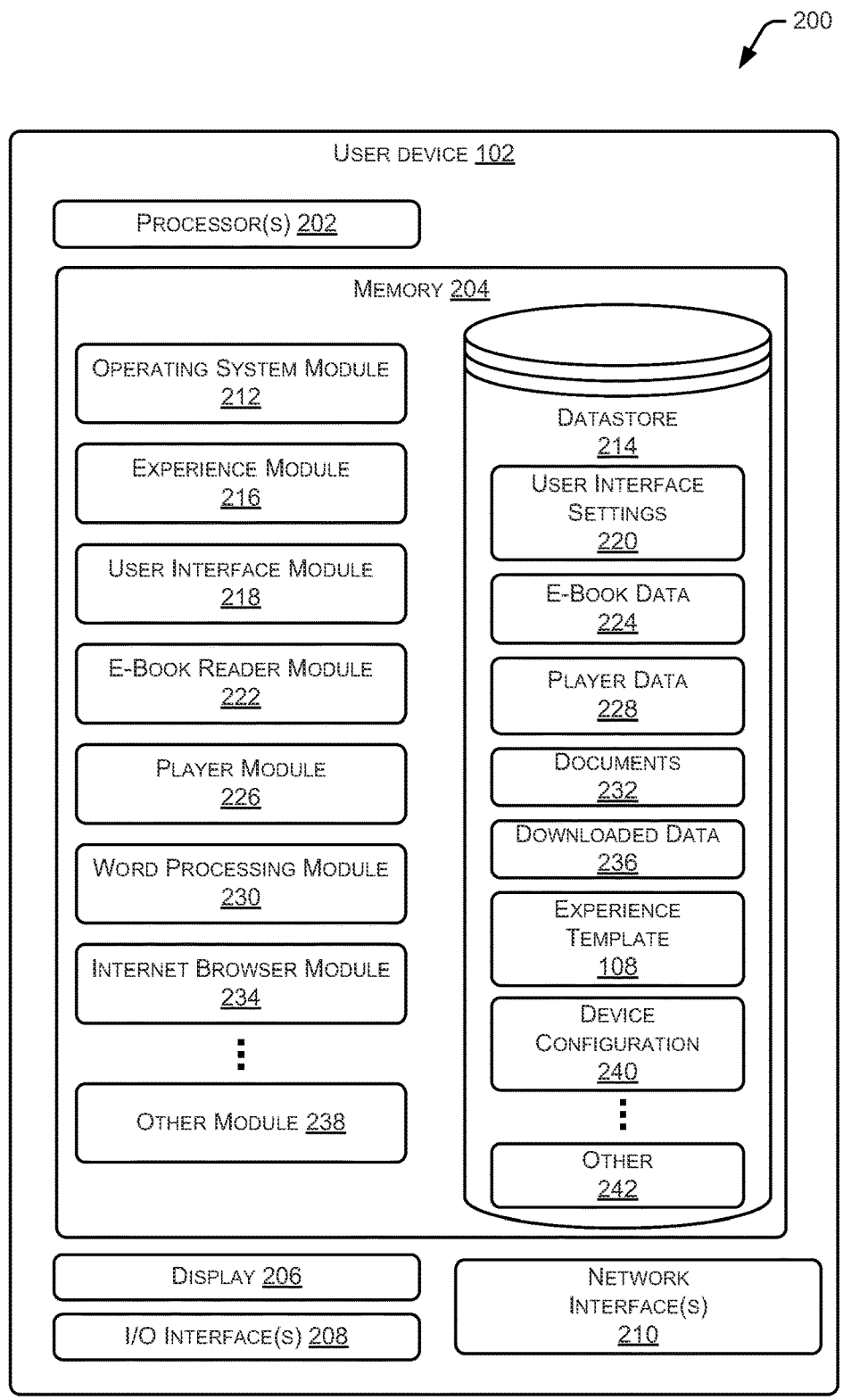
FIG. 2 illustrates a block diagram of a user device including an experience module configured to process experience templates in accordance with an embodiment of the disclosure.

FIG. 2 illustrates a block diagram 200 of a user device 102. The user device 102 may comprise one or more processors 202, one or more memories 204, one or more displays 206, one or more input/output ("I/O") interfaces 208, and one or more network interfaces 210. The user device 102 may include other devices not depicted. For example, the processor 202 or an outboard clock may provide timing data, one or more accelerometers may generate motion input data, and so forth.

The processor 202 may comprise one or more cores and is configured to access and execute at least in part instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while power is provided to the memory or non-volatile in that information is retained without power necessarily being provided to the memory.

The display 206 is configured to present visual information to the user 104. The display 206 may comprise a reflective or emissive display configured to present images, which appear to be two- or three-dimensional to the user 104. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 206 may be configured to present images in monochrome, color, or both. In some implementations, the display 206 of the user device 102 may use emissive, reflective, or combination displays with emissive and reflective elements.

The one or more I/O interfaces 208 may also be provided in the user device 102. These I/O interfaces 208 allow for coupling devices such as keyboards, joysticks, touch sensors, cameras, microphones, speakers, haptic output devices, external memories, and so forth to the user device 102.

The one or more network interfaces 210 provide for the transfer of data between the user device 102 and another device directly such as in a peer-to-peer fashion, via a network, or both. The network interfaces 210 may include, but are not limited to, personal area networks ("PANs"), wired local area networks ("LANs"), wireless local area networks ("WLANs"), wireless wide area networks ("WWANs"), and so forth. The network interfaces 210 may utilize acoustic, radio frequency, optical, or other signals to exchange data between the user device 102 and another device such as an access point, a host computer, another user device 102, and the like.

The one or more memories 204 may store instructions for execution by the processor 202 to perform certain actions or functions. These instructions may include an operating system module 212 configured to manage hardware resources such as the I/O interfaces 208 and provide various services to applications or modules executing on the processor 202. The one or more memories 204 may also store a datastore 214. The datastore 214 may comprise one or more databases, files, linked lists, or other data structures.

An experience module 216 is stored in the memory 204. The experience module 216 is configured to generate, implement, or otherwise process experience templates 108. The experience module 216 is configured to acquire data which describes at least a portion of the device experience 106 as presented on the user device 102. The experience module 216 may also be configured to implement an experience template 108. Implementing an experience template 108 may comprise setting one or more user interface settings, setting a state of one or more modules, or a combination thereof based at least in part on the experience template 108.

A user interface module 218 is configured to provide a user interface which handles inputs from and outputs to the user 104 during operation of the user device 102. User input may include key presses, touches on a touch screen, movement of the user device 102 or a portion thereof, speech input, and so forth. User outputs may include presentation on the display 206, sound from a speaker, haptic output generating a physical sensation or the appearance of a physical sensation, and so forth. The user interface module 218 may be configured to allow the user interface to be modified. For example, a default gesture made by the user 104 on a touch sensor of the user device 102 may be modified to initiate a different command on the user device 102. In another example, a user 104 may set particular colors to be used in the presentation of text.

The user interface module 218 may store user interface settings 220 in the datastore 214. These user interface settings 220 may include, but are not limited to, language, preferred text-to-speech voice, speaker volume level, microphone gain, menu colors, menu settings, gestures, and so forth. The experience module 216 may access the user interface settings 220 at least in part while generating or implementing an experience template 108 to read or write user interface settings.

The memory 204 may include one or more other modules which, when executed by the processor 202 perform one or more operations. The following modules are included by way of illustration, and not as a limitation. Furthermore, while the modules are depicted as stored in the memory 204, in some implementations, these modules may be stored at least in part in external memory, such as in a server accessible via the network 110.

An e-book reader module 222 is configured to present e-books. The e-book reader module 222 may be configured to provide for presentation of e-books, navigation therein, and so forth. E-book data 224 may be stored in the datastore 214. This e-book data 224 may include e-book content, data about the state of the e-book reader module 222, and so forth. For example, the e-book data 224 may comprise text for the play "Othello" by William Shakespeare as well as state data such as a current location within the e-Book.

A player module 226 is configured to play or otherwise present back audio, video, pictures, or other media content such as received by the content server 114. The player module 226 may store or access player data 228 in the datastore 214. The player data 228 may include content such as music, video, pictures, and so forth, as well as data about the state of the player module 226, such as state data indicating that a particular song track was paused at a particular time.

A word processing module 230 in the memory 204 is configured to allow the user 104 to enter and manipulate text on the user device 102. Documents 232 and other data including state data associated with the word processing module 230 may be stored in the datastore 214. For example, the state data may indicate that the word processing document has a disabled spell checker.

An internet browser module 234 is configured to provide access to content such as web pages and so forth. For example, the internet browser module 234 may be configured to render at least a portion of hyper-text markup language ("HTML") files on the display 206. Downloaded data 236 and other information associated with the internet browser module 234 including state data may be stored in the datastore 214. For example, the state data may indicate that the internet browser is configured to disallow connectivity to unencrypted sites.

Other modules 238 may be present in the memory 204 as well, such as, virtual private networking modules, text-to-speech modules, speech recognition modules, and so forth.

The datastore 214, may store other data such as one or more experience templates 108, device configuration 240, and other data 242. The experience templates 108 are described below in more detail with regard to FIG. 4. The device configuration 240 may include network interface settings such as network identifiers, security settings, country of origin data, and so forth. The other data 242 may include log data such as time stamps indicating when particular operations took place, information about what users 104 have accessed on the user device 102, and so forth.

Figure 3:
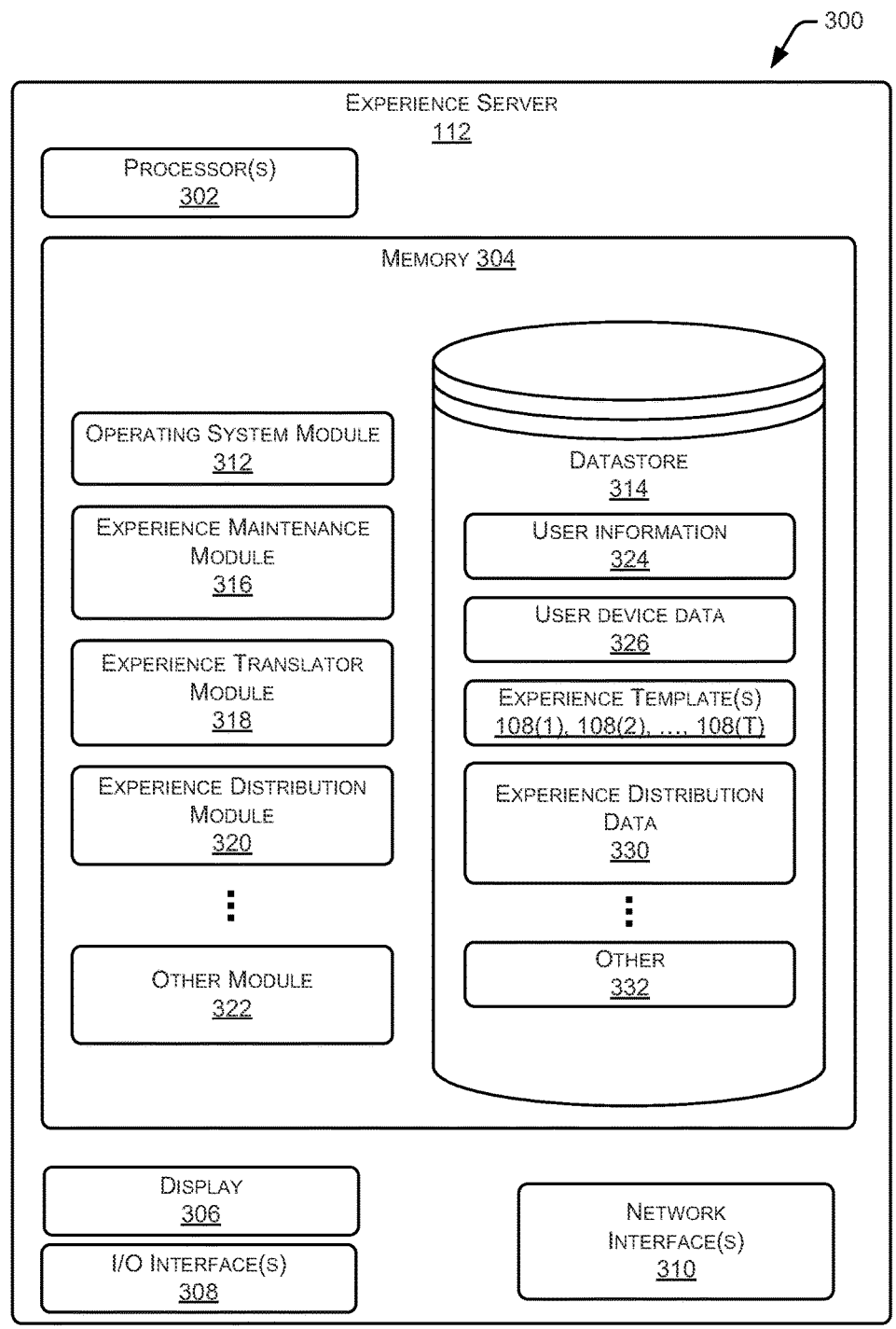
FIG. 3 illustrates a block diagram of an experience server including an experience module configured to generate, distribute, translate, and otherwise process experience templates in accordance with an embodiment of the disclosure.

FIG. 3 illustrates a block diagram 300 of the experience server 112. As described above, the experience server 112 is configured to generate, distribute, translate, and otherwise process experience templates. The experience server 112 may comprise one or more processors 302, one or more memories 304, one or more displays 306, one or more input/output ("I/O") interfaces 308, and one or more network interfaces 310. The memory 304 may store an operating system module 312 and a datastore 314. These components are similar to those described above with regard to FIG. 2.

An experience maintenance module 316 is stored in the memory 304. The experience maintenance module 316 is configured to generate, receive, distribute, validate, translate, or otherwise process experience templates 108. The experience maintenance module 316 may be configured to generate experience templates 108 based at least in part upon input from the users 104. For example, the user 104(1) may use a web interface to build a custom experience template 108. The experience maintenance module 316 may receive experience templates 108 from the user devices 102. For example, the user device 102(1) may connect to the experience server 112 via the network 110 and transfer the experience template 108 as one or more files. The experience templates 108 may be validated by checking for inconsistencies, improper actions, disallowed functions, and so forth. Invalid experience templates 108 or portions thereof may be discarded, rejected, tagged as unusable, and so forth.

The experience templates 108 may be related to one another. In one implementation, experience templates 108 may depend from one another. For example, the experience template 108(1) may be a parent of subordinate experience template 102(2). The experience maintenance module 316 may be configured to maintain these relationships.

The memory 304 may also store an experience translator module 318. As described above, the user devices 102 may differ from one another in available hardware, installed software modules, and so forth. For example, the user device 102(1) may use a touch screen for input while another device 102(3) may have a keyboard. Also user device 102(1) may be equipped with a color display while user device 102(2) has a monochrome display. The experience translator module 318 is configured to determine the differences between user devices and modify the experience templates 108 accordingly. Continuing the example above, the experience template 108 for the user device 102(1) as translated for use on the user device 102(3) may omit touch-based gestural input changes and replace them with keyboard shortcuts.

An experience distribution module 320 is configured to receive, send, post, or otherwise distribute experience templates 108 to one or more user devices 102. The experience distribution module 320 may be configured to operate in conjunction with the content server 114, the social network server 116, and so forth. In one implementation, the experience distribution module 320 may act as a front-end, receiving and sending experience templates 108 to the user devices 102. The experience distribution module 320 may transfer experience templates 108 or portions thereof using file transfer protocol, hyper-text transfer protocol, email, or other protocols. In some implementations, the experience distribution module 320 may be configured to distribute experience templates 108 using a particular type of network connection with the user device 102. For example, the experience distribution module 320 may be configured to provide experience templates 108 via a wireless local area network where available rather than using a wireless wide area network such as a cellular data network.

The experience distribution module 320 may also be configured to provide to users 104 alerts, notifications, messages, or automatically update experience templates 108 which have been added or modified. For example, when the teacher who created the experience template 108 for student users updates that experience template 108, the user devices 102 associated with the student users 104 who have previously acquired the experience template 108 may be prompted to implement the new experience template 108.

The users 104 may generate different versions of experience templates 108. The experience distribution module 320 may be configured to maintain versioning or version control over the experience templates 108.

Other modules 322 may be present in the memory 304 as well. These modules may provide functions including authorization, authentication, accounting, security, and so forth. For example, a security module may be configured to verify the identity of the users 104 submitting the experience templates 108 for distribution.

The datastore 314 may be configured to store user information 324. The user information 324 may include user logon credentials, access permissions, language preferences, and so forth. User device data 326 may be stored in the datastore 314 as well. The user device data 326 describes hardware, software, or both which comprises the user device 102. The user device data 326 may be general in that it is associated with particular models of the user device 102, or may be specific in that data about a particular user device 102 is maintained. For example, the user device data 326 may indicate that the models "Epsilon" of the user devices 102 have touch screens while the models "Rho" of the user devices 102 have keyboards. In another example, the user device data 326 may be device specific, such as the user device 102(1) has 27 gigabytes of memory available, and a French-to-English translator module available. The user device data 326 may also include services which the user device 102 has access to. For example, the user device data 326 may indicate that the user device 102(3) has access to WLANs provided by a particular company.

The datastore 314 may also store the experience templates 108(1), 108(2), . . . , 108(T). In some implementations, the experience templates 108 or a portion thereof may be stored in other datastores, such as on other devices. For example, one or more of the experience templates 108 may be stored on the social network server 116.

Experience distribution data 330 may be maintained in the datastore 314. The experience distribution module 320 may generate data, which is stored in the experience distribution data 330. For example, the experience distribution module 320 may record which user devices 102 have received the experience template 108(3), whether that experience template 108(3) has been referred to other users, and so forth. The experience distribution data 330 may be used for administrative or billing purposes. In some implementations, a fee may be assessed for transfer of an experience template 108 either to the experience server 112, from the experience server 112, or both to and from the experience server 112.

Other data 332 may also be stored in the datastore 314, such as, duration of use of a particular experience template 108, information about usage to generate experience templates 108 using the experience server 112, and so forth.

Figure 4:
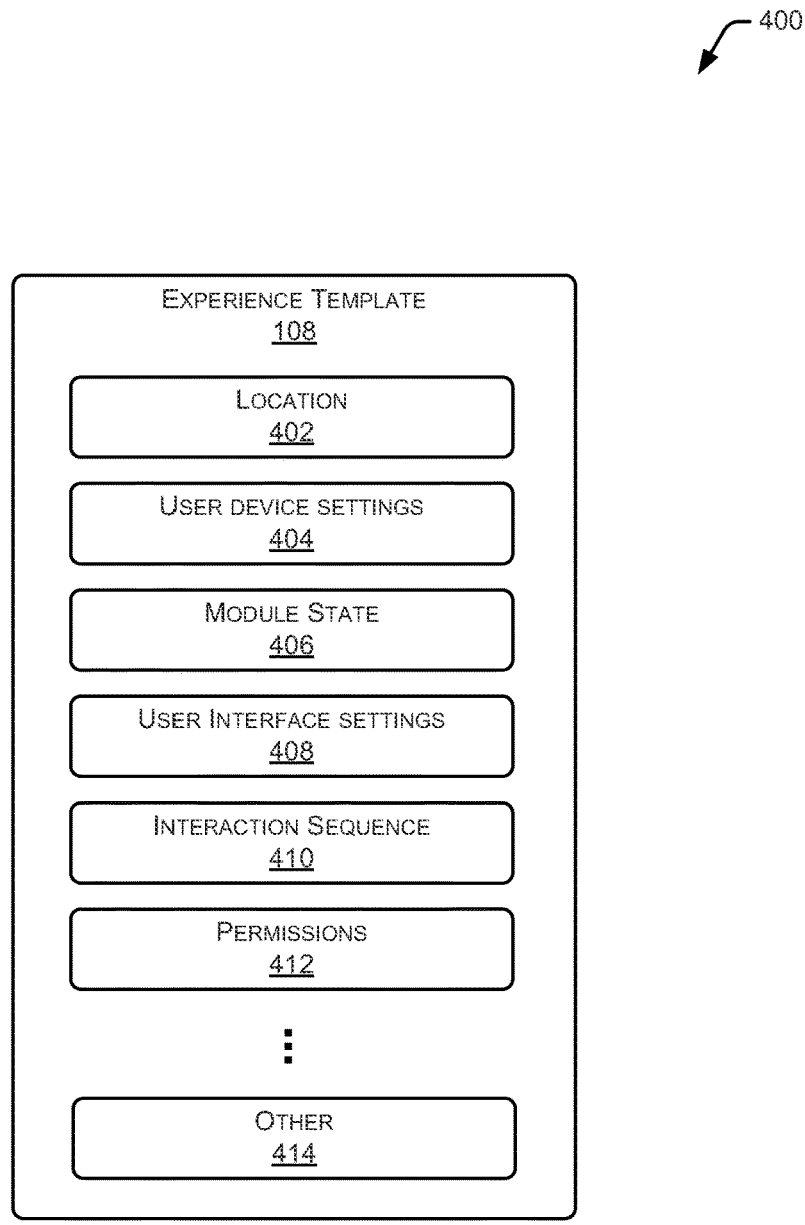
FIG. 4 is a block diagram of an experience template in accordance with an embodiment of the disclosure.

FIG. 4 is a block diagram 400 of an experience template 108. As described above, the experience template 108 may be generated by the user device 102, the experience server 112, or a combination thereof. The experience template 108 allows the device experience 106, or a portion thereof, to be shared between user devices 102. The experience templates 108 may be associated with individual user devices 102, models of user devices 102, families of several models of user devices 102, and so forth.

The experience template 108 may comprise location information 402. This location information 402 may be determined by manual input from the user, from a navigation system such as a global positioning system receiver, from a network such as a cellular data network or wireless network, and so forth. In some implementations, the location information 402 may be used to configure the device experience 106 to manifest at a particular location. For example, the device experience 106 of a user travelling to Asia may be tailored to adjust time zones of the user device 102, present news articles and weather local to the location 402, and so forth.

User device settings 404 may be incorporated into the experience template 108. The user device settings 404 include one or more of operating system settings, user interface settings, network configurations, power settings, and so forth. Other examples of the user device settings 404 include a time zone, a default language, and so forth. The user device settings 404 may also provide connectivity information such as permitted wireless networks, logon credentials, and so forth.

The experience template 108 may include module state 406 data. The module state 406 describes presence, state, configuration, or other condition of one or more modules executing on the user device 102, or which are accessed by the user device 102. For example, in one implementation the module state 406 data may indicate that the e-Book reader module 222 and player module 226 are used by the experience template 108. In some implementations the experience template 108 may be used to distribute the modules.

The module state 406 may include data such as a preferred window display position relative to pixels on the screen for the e-Book reader module 222, page to initially display in the e-Book, disabling a spell check in the word processing module 230, language used in the module, and so forth. Other module state 406 information may include web links accessed, position in an audio or video file, and so forth.

User interface settings 408 define aspects of the user interface as provided by the user interface module 218. These may include settings such as overall user interface language, screen savers, sounds, volume settings, colors, commands to initiate particular operations, and so forth. Commands to initiate particular operations may include touch gestures, motion gestures of the user device 102, and so forth.

The experience template 108 may provide one or more interaction sequences 410. The interaction sequence 410 comprises a series of events such as state changes to the user interface, one or more modules, the user device settings, and so forth. The interaction sequence 410 may comprise a timeline or a time-sensitive series of the events occurring on the user device 102. As a result, the interaction sequence 410 is not constrained to events occurring within a particular module. For example, a particular interaction sequence 410 may include changes to the player module 226, the word processing module 230, and the internet browser module 234. Thus, the interaction sequence 410 may include events occurring across one or more modules.

The interaction sequence 410 may be replayed on the same or another user device 102, allowing the same set of events to be recreated. This replay may be done in real-time, with pre-determined timing, or have events triggered by a pre-determined occurrence. For example, the real-time interaction sequence 410 may record timing obtained from the clock during recording of the interaction sequence 410. During playback, substantially the same timing is observed. Thus, the interaction sequence 410 and corresponding interaction sequence data comprises timing data obtained at least in part from the clock and is associated with the one or more recorded changes such that upon presentation of the interaction sequence data the one or more recorded changes occur with substantially the same time intervals between them. As used herein, substantially the same time intervals indicates that the timing may be within a pre-determined tolerance, such as plus or minus one second, to account for variances in clock operation between user devices 102 or the same user device 102 under different operating conditions such as changes in temperature, battery voltage, and so forth.

In comparison, pre-determined timing may be that five seconds are to elapse between events, regardless of the duration between events during recording. The events may be triggered by a pre-determined occurrence, such as a shake of the device or an activation of a button.

The experience template 108 may include permissions 412. These permissions 412 specify authorized user devices 102 or users 104 who may play back the experience template 108. The permissions 412 may be specific to a particular window of time, location, and so forth. For example, where the experience template 108 is configured by a teacher for providing a test, the permissions 412 may specify that during playback of the experience template 108 only particular modules, such as the e-Book reader module 222, may be active and that the total duration that the word processing module 230 may be open to accept answers is twenty minutes.

The experience template 108 may comprise other 414 information. For example, the experience template 108 may contain state data for use by an Internet site accessed by the Internet browser module 234 or another module. The other 414 information may also include user device 102 registration information or processes, and so forth. In one implementation the other 414 information may include application data such as calendars, address data, and so forth.

Additionally, in some implementations the experience template 108 may incorporate or itself be part of another experience template 108. For example, the experience template 108(9) may be a subset or part of the experience template 108(3) which in turn is a subset of 108(10). As described above, when different versions or subordinate/superior versions of the experience template 108 exist, the experience maintenance module 316 may, in some implementations, be configured to maintain version control, synchronize the experience templates 108, and so forth.

Figure 5:
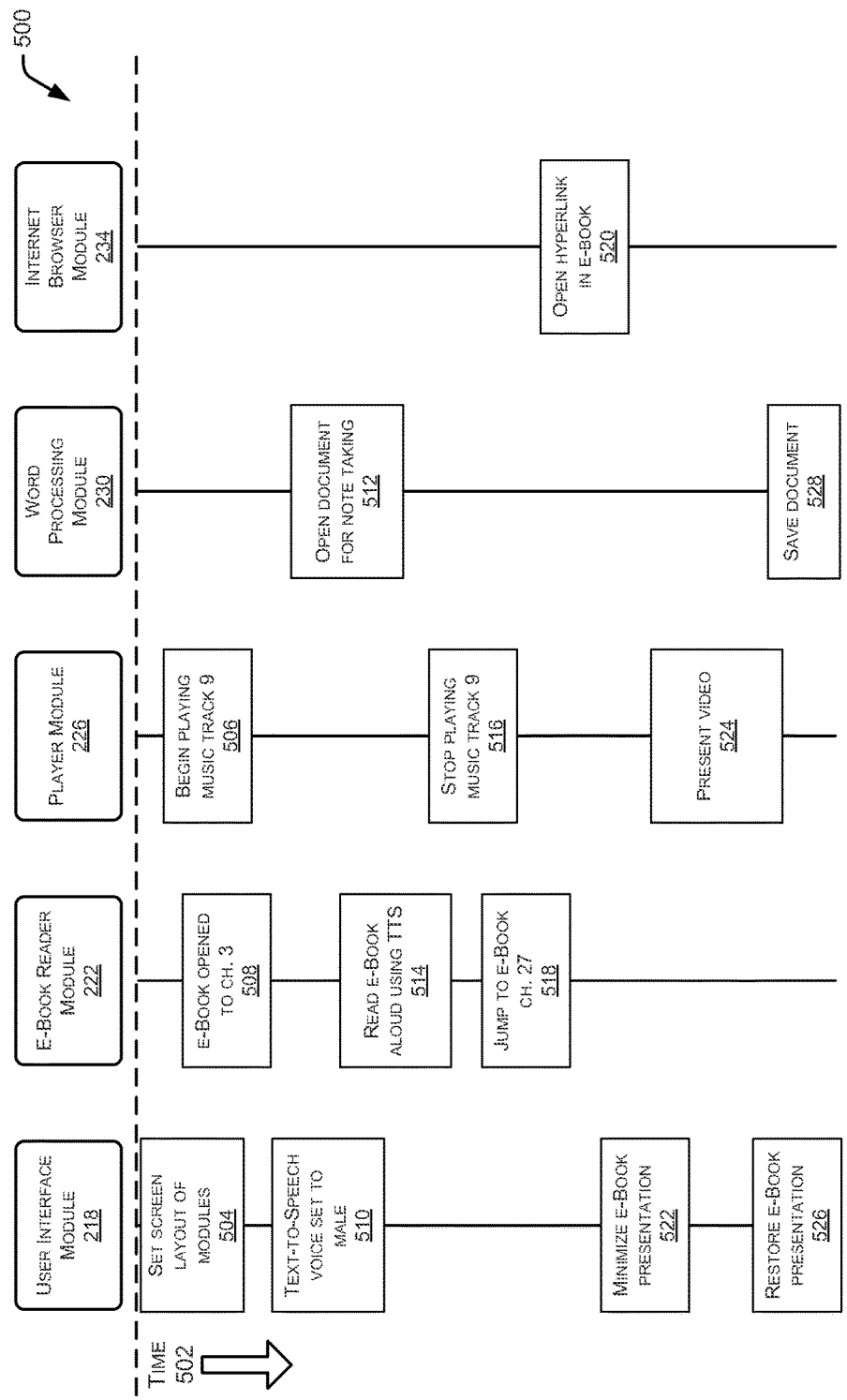
FIG. 5 is a diagram describing an interaction sequence which may be stored in an experience template in accordance with an embodiment of the disclosure.

FIG. 5 is a diagram 500 illustrating an interaction sequence 410 which may be stored in an experience template 108. In this diagram several modules of the user device 102 are shown to illustrate one exemplary configuration of the user device 102 and therefore should not be construed as being limiting. In the embodiment shown in FIG. 5, the user interface module 218, the e-book reader module 222, the player module 226, the word processing module 230, and the internet browser module 234 are depicted above a broken line. In this diagram, time is depicted by arrow 502, increasing down the page. As described above, and illustrated here, the interaction sequence 410 comprises a series of events.

The interaction sequence 410 may be performed on a user device 102 by the user 104 and recorded, entered by the user 104 using the experience server 112, or generated and/or edited using a combination of both. For example, the following interaction sequence 410 may be created by the user 104(1) who is presenting a lesson to student users 104. The user 104(1) may create a device experience 106(1) including the interaction sequence 410 by performing the interaction sequence 410 on the user device 102(1). While the following example is described from the point of view of the user 104(1) who is creating the lesson and generating the device experience 106(1), because the interaction sequence 410 depicted herein may be played back, the student users 104 may recreate the device experience 106(1) for their own use.

During this playback of the interaction sequence 410, the user 104 may then experience the interaction sequence 410 without having to manually start modules, select music for playback and so forth. The events recorded in the interaction sequence 410 may unfold to the user 104 playing back the interaction sequence 410 with particular timing, or transition between events may be triggered by a user input, such as activating a control.

At block 504, the user 104(1) configures the user interface module 218 to set the screen layout of the modules. For example, the user 104(1) arranges an e-book module's window on the display 206 at a particular location while other windows at other particular locations on the display 206 are designated for the other modules. At block 506, user 104(1) enters commands to begins playback of a particular music track, track number nine, with the player module 226.

At block 508, the user 104(1) commands the e-book reader module 222 to open a particular e-book to chapter three. The user 104(1) may then, at block 510, sets the default text-to-speech voice to male in the user interface module 218. At block 512, the user 104(1) opens the word processing module 230 to a document for note taking.

At block 514, the e-book reader module 222 begins to read aloud from chapter three of the e-book using the text-to-speech and speaking in the male voice previously selected at block 510. After coming to a particular point in the e-book, the player module 226 at block 516 stops playing music track nine.

At block 518, the user 104(1) initiates a command to have the e-book reader module 222 jump presentation of the e-book from chapter three to chapter 27. Activation of a hyperlink in the e-book by the user 104(1) at block 520 opens the link in the internet browser module 234. Because the screen layout was previously specified at block 504 by the user 104(1), the material resulting from the hyperlink is presented in a particular place on the screen.

After the presentation of the hyperlink is complete, the user 104(1) building the device experience 106(1) which includes this interaction sequence 410, wants to emphasize a particular piece of video content and minimize distraction to the student users 104. As a result, the user 104(1) instructs the interface module 218 at block 522 to minimize the e-book presentation. Once minimized, the user 104(1) proceeds to activate presentation by the player module 226 of the video content at block 524. Once completed, the user interface module 218 may restore the e-book presentation at block 526 on the display 206. To make sure that the student user's 104 work is not lost, the user 104(1) recording the interaction sequence 410 may have configured the interaction sequence 410 of this experience template 108 to have the word processing module 230 save the document at block 528.

This series of events as generated by the user 104(1) may thus be saved in the interaction sequence 410 which is part of the experience template 108. As described above, this experience template may be distributed by the experience distribution module 320, user device 102 to user device 102, via the social network server 116, and so forth.

Illustrative Processes

Figure 6:
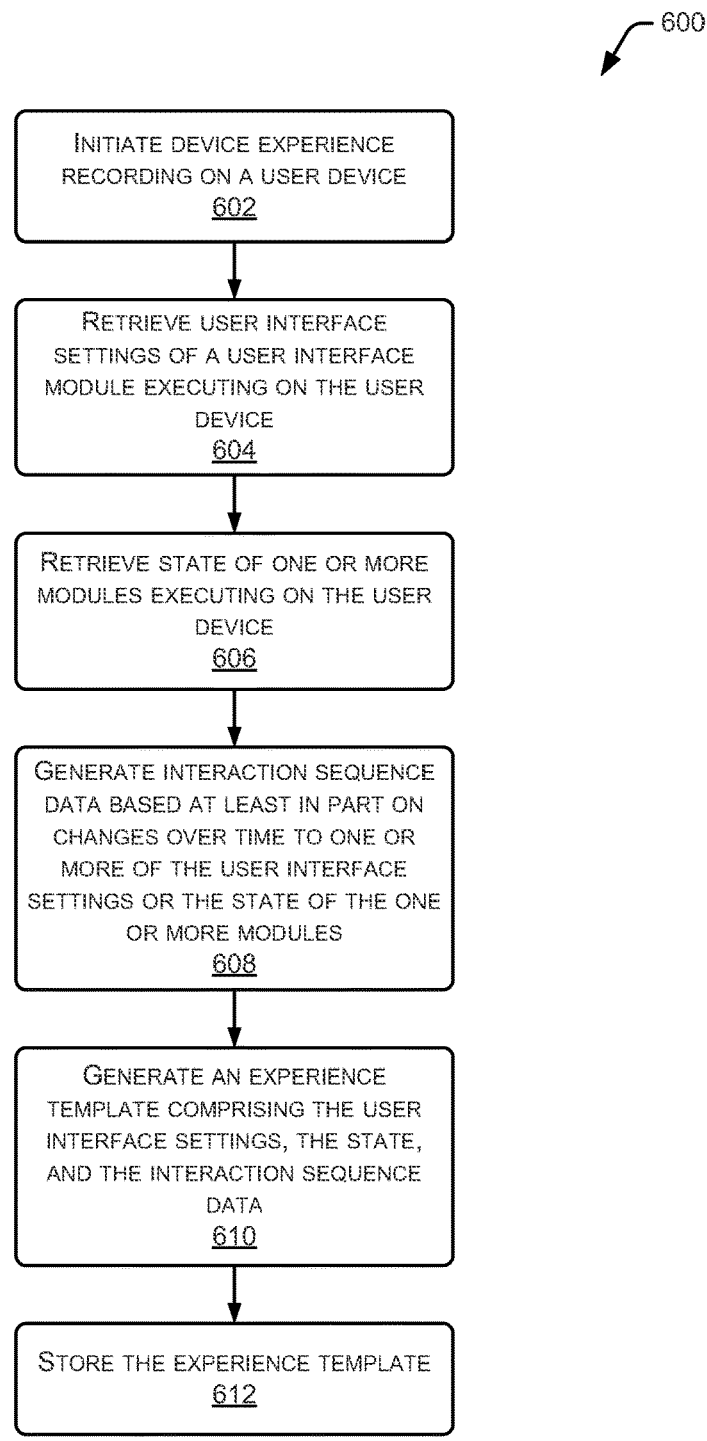
FIG. 6 illustrates a flow diagram of a process of recording a user device experience template in accordance with an embodiment of the disclosure.

FIG. 6 illustrates a flow diagram 600 of a process of recording a user device experience template in accordance with an embodiment of the disclosure. In some implementations, this process may be executed by the experience module 216 on the user device 102.

Block 602 initiates device experience recording. The experience recording may comprise monitoring or storing events which take place on the user device 102. The experience recording may be stored to the memory 204, or to other memory coupled to the user device 102.

Block 604 retrieves user interface settings 408 as presently set on the user device 102 from the datastore 214. For example, the experience module 216 may access data used by the user interface module 218.

Block 606 retrieves module state 406 for one or more modules stored in the memory 204 and executing on the at least one processor 202. As described above, in one implementation, the one or more modules may comprise one or more of an e-book reader module 222, a player module 226, a word processing module 230, or an internet browser module 234.

Block 608 generates interaction sequence data 410 based at least in part on changes over time to one or more of the user interface settings 408, or the module state 406 of the one or more modules. In other implementations, other data such as the user device settings 404 may be used at least in part to generate the interaction sequence 410 data. In some implementations, the interaction sequence 410 may comprise timing data obtained at least in part from a clock.

Block 610 generates an experience template 108 comprising the user interface settings 408, the module state 406 of one or more modules, and the interaction sequence 410 data. This experience template 108 comprises at least a portion of the device experience 106.

Block 612 stores the experience template 108 in memory. For example, the experience template 108 may be stored in memory 204 of the user device 102, in memory 304 of the experience server 112, or in other memory. In some implementations, at least a portion of the experience template 108 may be sent to another device via the network interface 210.

Figure 7:
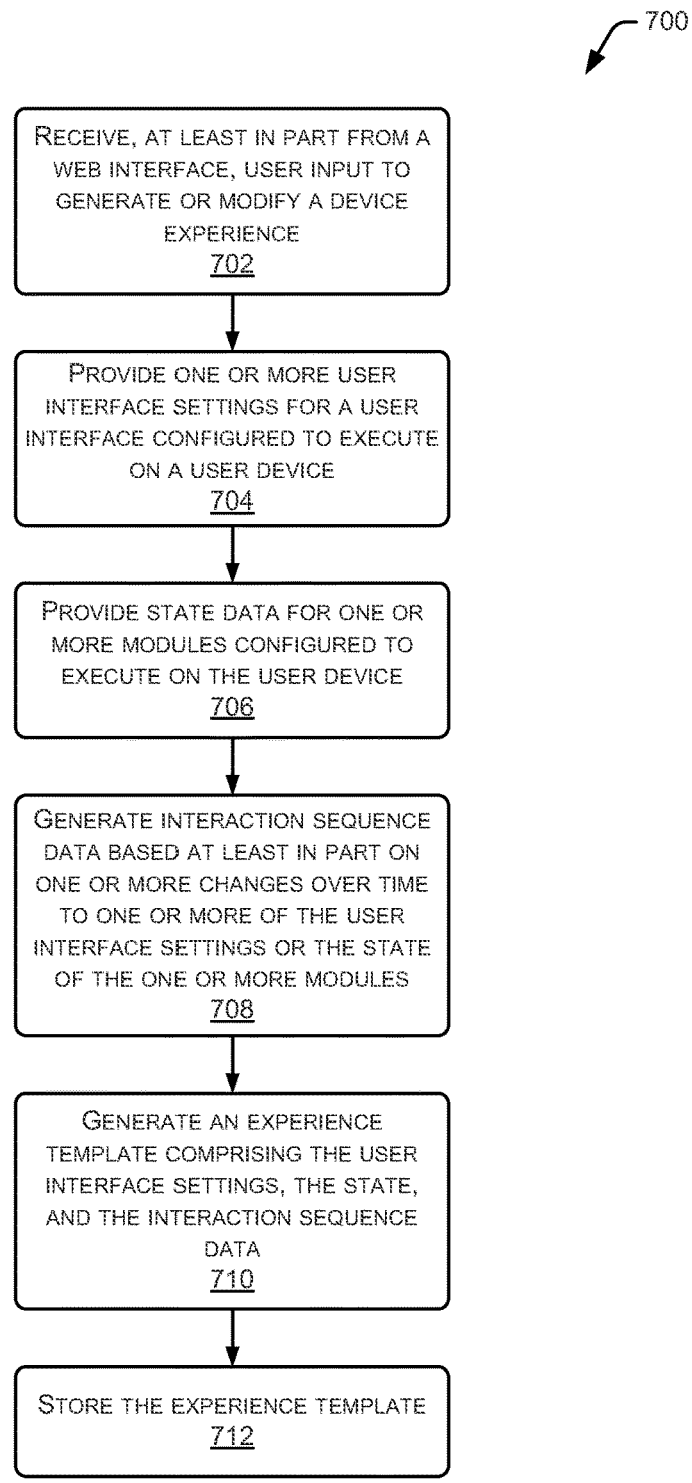
FIG. 7 illustrates a flow diagram of a process of generating a user device experience template in accordance with an embodiment of the disclosure.

FIG. 7 illustrates a flow diagram 700 of a process of generating a user device experience template. This process may be implemented by the experience server 112.

Block 702 receives, at least in part from a web interface, user input to generate or modify a device experience 106 for a user device 102. For example, the experience server 112 may provide a web interface comprising a simulated or virtual user device 102 which the user 104 may manipulate.

Block 704 provides one or more user interface settings for a user interface configured to execute on the user device 102. For example, the user interface settings as manipulated by the user 104 in the virtual user device 102 may be stored.

Block 706 provides state data for one or more modules configured to execute on the user device 102. For example, in the virtual user device 102 presented via the web interface, the user 104 may initiate the e-book reader module 222 to open to a particular chapter in a particular electronic book.

Block 708 generates interaction sequence data describing an interaction sequence 410. The interaction sequence data may be generated based at least in part on one or more changes over time to one or more of the user interface settings, or the state data of the one or more modules.

Block 710 generates an experience template 108 comprising the user interface settings and the state data. In some implementations where the interaction sequence data is available or selected for inclusion in the experience template 108, the generation of the experience template 108 may further comprise the interaction sequence data.

Block 712 stores the experience template 108, such as in the memory 304 or in another memory. Once stored, this experience template 108 may be provided to a second user device 104.

Figure 8:
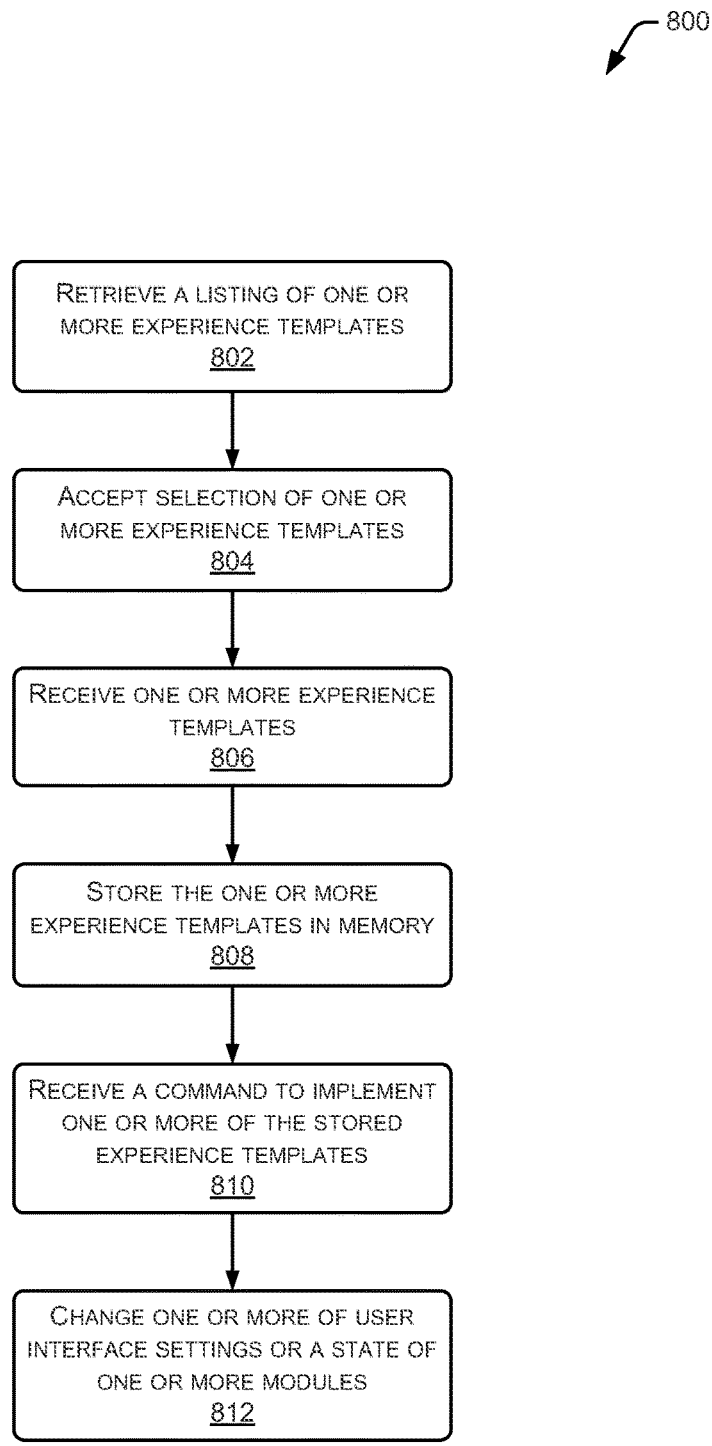
FIG. 8 illustrates a flow diagram of a process of distributing one or more experience templates in accordance with an embodiment of the disclosure.

FIG. 8 illustrates a flow diagram 800 of a process of distributing one or more experience templates in accordance with an embodiment of the disclosure. In some implementations, this process may be executed by the experience distribution module 320 on the experience server 112, by the experience module 216 on the user device 102, or a combination thereof.

Block 802 retrieves a listing of one or more experience templates 108. For example, the experience distribution module 320 may access the datastore 314. In some implementations, this listing may be determined based on permissions or access levels assigned to the user device 102, the user 104, or a combination thereof. In some implementations, the retrieving may comprise accessing a server via a network interface device.

Block 804 accepts a selection of one or more experience templates 108. For example, the user 104 may select the one or more experience templates using a control on the user device 102.

Block 806 receives one or more experience templates 108. For example, the user device 102 may receive the one or more experience templates 108 from the experience server 112 via the network 110. As described above, the one or more experience templates 108 may comprise one or more of a location 402, user device settings 404, module state 406, user interface settings 408, or interaction sequence 410. The interaction sequence 410 may describe a series of events or state changes over time or occurring at predetermined times to the one or more modules, the user interface, or a combination thereof.

Block 808 stores the one or more experience templates 108. The templates may be stored in the memory 204 of the user device 102, the memory 304 of the experience server 112, or in memory of another device such as the social network server 116.

Block 810 receives a command to implement the one or more stored experience templates 108. For example, the user 104 may accept a prompt in the user interface of the user device 102 to accept the experience template 108.

Block 812, at least partly in response to the command to implement, changes one or more of user interface settings or state of one or more modules. As described above, the one or more modules may comprise an e-book reader module 222, a player module 226, a word processing module 230, or an internet browser module 234. The one or more modules may also comprise an operating system module 212 and implementing the change may comprise changing one or more network settings. For example, the network settings may be set to access a particular WLAN having particular security settings.

The one or more modules may also comprise a user interface module 218 and implementing the change may comprise changing one or more user interface settings, such as a default language. For example, the user device 102 may be configured via the experience template 108 to set the default language for the user interface to Esperanto.

Figure 9:
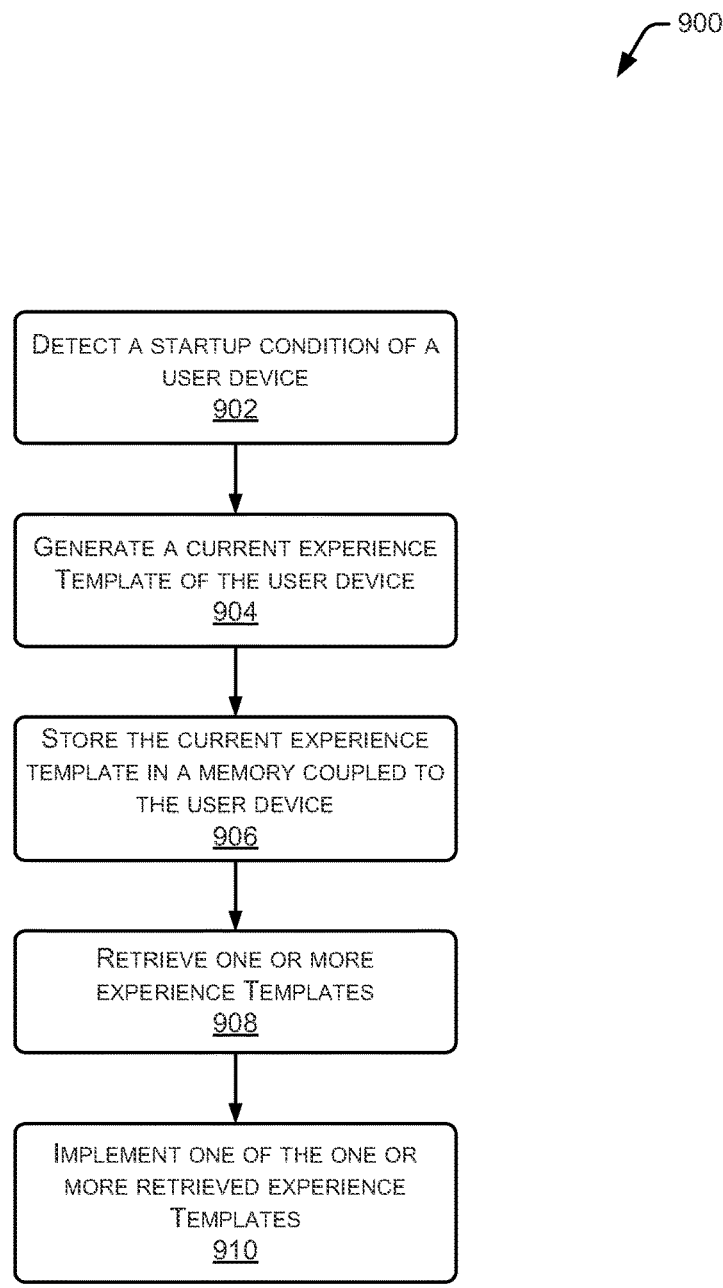
FIG. 9 illustrates a flow diagram of a process of implementing one or more experience templates in accordance with an embodiment of the disclosure.

FIG. 9 illustrates a flow diagram 900 of a process of implementing one or more experience templates in accordance with an embodiment of the disclosure. In some implementations, this process may be executed by the experience module 216 on the user device 102. In some implementations, this process may aid in the configuration of a newly-purchased user device 102 during initial activation by the user 104. For example, the user 104 may order the user device 102 from an online merchant. The user 104 may create or select an experience template 108 at checkout from the online merchant which may then be implemented on the user device 102.

Block 902 detects a startup condition associated with the at least one processor. For example, a flag may be set in the operating system module 212 or stored in the datastore 214 indicating that the user device 102 has been restarted. In some implementations other conditions may be detected and used. For example, shutdown of the at least one processor, closing a particular module, and so forth.

Block 904 generates a current experience template 108 prior to implementing the one or more retrieved experience templates 108. Generation of the current experience template 108 may prevent the user 104 from inadvertently losing a device experience 106. In some implementations, this step may be omitted.

In one implementation, generating the current experience template 108 may comprise retrieving one or more of the user interface settings 408, retrieving module state 406 for one or more modules, and generating interaction sequence 410 data based at least in part on changes to one or more of the user interface settings, or the state of the one or more modules.

Block 906 stores the current experience template 108 in the memory. Once stored, the user 104 may later retrieve and implement that experience template 108.

Block 908 retrieves one or more experience templates 108 from memory. For example, the experience templates 108 may be retrieved from the memory 204 of the user device 102.

Block 910 implements the one or more retrieved experience templates 108 by setting one or more of the user interface settings, the state of one or more modules, or a combination thereof based at least in part on the one or more retrieved experience templates 108.

In some implementations, approval from a user 104 may be received prior to implementing the one or more retrieved experience templates. For example, the user interface may present a prompt to the user confirming that the experience template 108 is to be applied to the user device 102.

Figure 10:
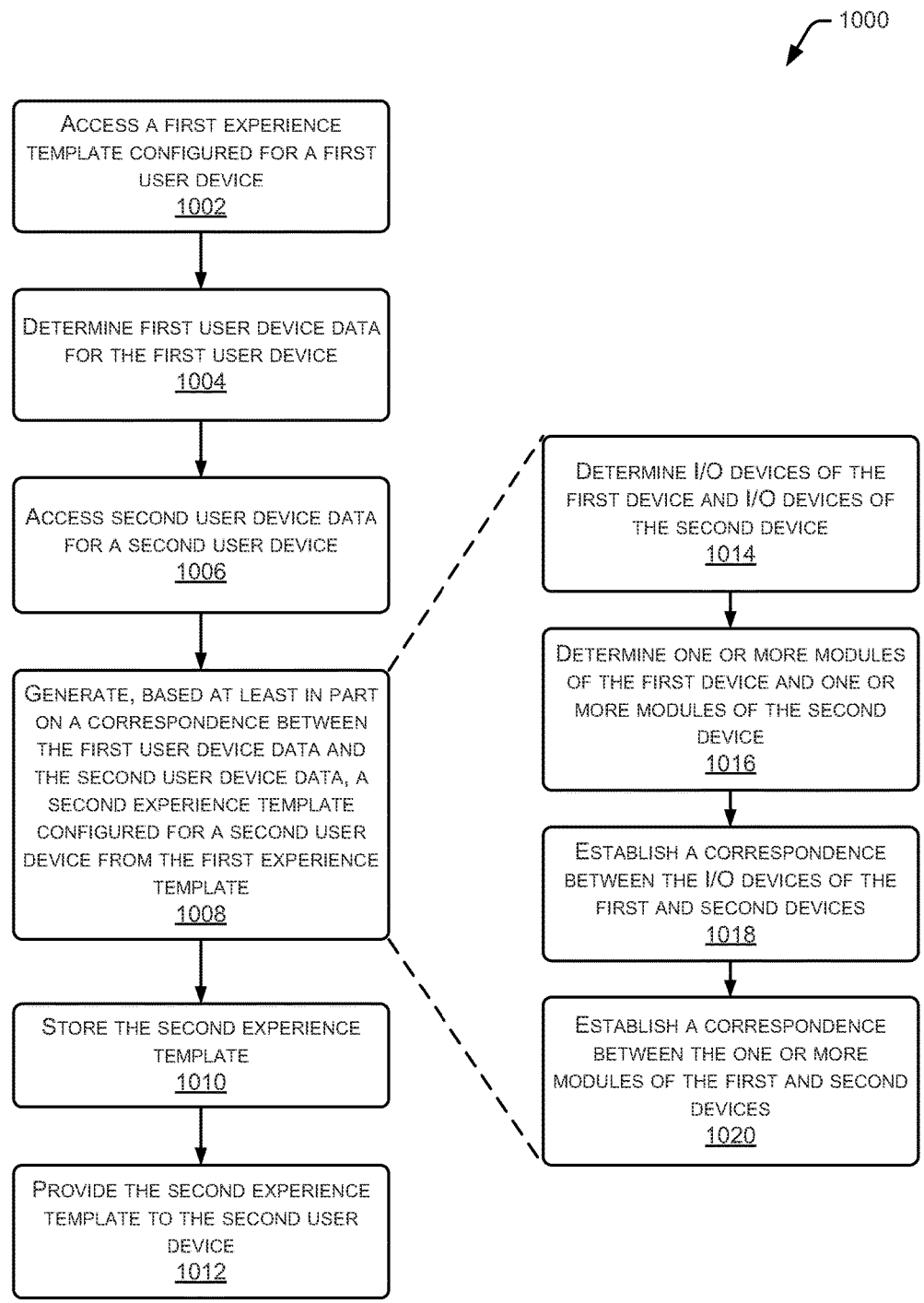
FIG. 10 illustrates a flow diagram of a process of translating an experience template in accordance with an embodiment of the disclosure.

FIG. 10 illustrates a flow diagram 1000 of a process of translating an experience template 108 in accordance with an embodiment of the disclosure. In some implementations, this process may be executed by the experience distribution module 320 on the experience server 112, by the experience module 216 on the user device 102, or a combination thereof. As described above, in some implementations, experience templates 108 may be shared among user devices 102 with different hardware and/or software configurations.

Block 1002 accesses a first experience template 108(1) configured for a first user device 102(1). Block 1004 determines first user device data 326(1) for the first user device 102(1). For example, the first user device data 326(1) may be retrieved from the datastore 314 which describes hardware, software, or both which comprises the first user device 102(1).

As described above, the first experience template 108(1), the second experience template 108(2), or both may comprise one or more of a location 402, user device settings 404, module state 406, user interface settings 408, or interaction sequence 410.

Block 1006 accesses second user device data 326(2) for a second user device 102(2). Block 1008 generates, based at least in part on a correspondence between the first user device data and the second user device data, a second experience template 108(2) configured for the second user device 102(2) based at least in part on the first experience template 108(1). This correspondence is discussed below with regard to block 1014. For example, the first device 102(1) may comprise a color display 206(1), and the second device 102(2) may comprise a monochrome display 206(2). The generation of the second experience template 108(2) may comprise translating colors into monochromatic shades for presentation.

Block 1010 stores the second experience template 108(2) in memory. For example, the second experience template 108(2) may be stored in the datastore 314 of the memory 304.

Block 1012 provides the second experience template 108(2) to the second user device 102(2). For example, the second experience template 108(2) may be transferred via the network 110.

In some implementations, the correspondence used in generating the second experience template 108(2) may comprise the following operations based at least in part on the first user device data 326(1) and the second user device data 326(2). Block 1014 determines input/output devices of the first device 102(1) and the input/output devices of the second device 102(2). Block 1016 determines one or more modules of the first device 102(1) and one or more modules of the second device 102(2). Block 1018 establishes a correspondence between the input/output devices of the first device 102(1) and the second device 102(2). For example, the touch sensor of user device 102(1) corresponds to the keyboard of user device 102(2).

Block 1020 establishes a correspondence between the one or more modules of the first device 102(1) and the second device 102(2). For example, the e-book reader module 222(1) on the user device 102(1) may be from one company while the e-book reader module 222(2) on the user device 102(2) may be from another. A correspondence between these two e-book reader modules may thus be made. In some implementations, the correspondence may include conversion between file formats.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
a clock;
at least one memory storing computer-executable instructions;
at least one processor configured to access the clock and the at least one memory and execute the computer-executable instructions to:
capture an interaction sequence resulting from a plurality of user interactions with the system;
determine first data indicative of a plurality of recorded changes over time to: a) one or more user interface settings, and b) one or more states of one or more modules;
determine second data indicative of an order of execution of the plurality of recorded changes;
determine timing data representing time intervals between individual changes of the plurality of recorded changes;
generate interaction sequence data using the first data, the second data, the timing data, at least a portion of user interface settings information, and at least a portion of state information for the one or more modules, wherein the interaction sequence data is representative of the interaction sequence;
determine a first formatting associated with inputs from a first type of input/output device for association with a first experience template;
generate the first experience template associated with the interaction sequence and the first formatting, the first experience template comprising at least the portion of the user interface settings information, at least the portion of the state information, and the interaction sequence data;
implement the first experience template by causing the plurality of recorded changes to be executed in accordance with the order of execution, the respective time intervals, and the first formatting;
cause a visualization of the plurality of recorded changes being executed, wherein the implementation of the first experience template results in: a same final user interface setting, and a same final module state as the interaction sequence;
generate a second experience template based at least in part on the first experience template;
determine a second formatting for association with the second experience template;
cause an operation of the set of operations to be executed, at least in part, using a second type of input/output device when the second experience template is implemented on a second user device; and
implement the second experience template.

2. The system of claim 1, wherein the timing data is determined at least in part using time stamps associated with the individual changes of the plurality of recorded changes indicated by the clock.

3. The system of claim 1, the one or more modules comprising one or more of an electronic book reader module configured to present electronic books, a player module configured to present audio or video media content, a word processing module configured to edit text, or an internet browser module configured to present information retrieved from a server.

4. The system of claim 1, wherein at least one of the plurality of recorded changes is triggered by user input.

5. The system of claim 1, wherein the plurality of recorded changes comprise accessing and presenting a first portion of content and subsequently accessing and presenting a second different portion of the content.

6. The method of claim 1, wherein the one or more states of the one or more modules include module state information indicative of a window display position of the one or more modules relative to a display of a device.

7. A method comprising:
detecting, by one or more computer processors coupled to at least one memory, a startup condition;
retrieving, responsive to detecting the startup condition, a first experience template, wherein the first experience template comprises interaction sequence data representative of an interaction sequence resulting from a plurality of user interactions with a device, the first experience template generated by:
determining first data indicative of a plurality of changes to at least one of: a) one or more user interface settings, and b) one or more states of one or more modules;
determining second data indicative of an order of execution of the plurality of changes;
determining timing data representing time intervals between individual changes of the respective plurality of user interactions;
generating interaction sequence data using the first data, the second data, the timing data, at least a portion of user interface settings information, and at least a portion of state information for the one or more modules, wherein the interaction sequence data is representative of the interaction sequence; and
determining a first formatting associated with inputs from a first type of input/output device for association with the first experience template;
determining a second formatting for association with a second experience template, such that implementation of the second experience template causes the interaction sequence to be executed, at least in part, using a second type of input/output device when implemented on a second user device;
implementing the first experience template by causing the plurality of changes to be executed in accordance with the order of execution, the respective time intervals, and the first formatting; and
causing a visualization of the plurality of recorded changes being executed and a same final user interface setting and a same final module state as the interaction sequence.

8. The method of claim 7, further comprising receiving approval from a user prior to the implementing the first experience template.

9. The method of claim 7, wherein the second experience template is generated prior to implementing the first experience template.

10. A method comprising:
accessing, by one or more computer processors coupled to at least one memory, a first experience template configured for a first user device, wherein the first experience template comprises interaction sequence data representative of an interaction sequence resulting from a plurality of user interactions with the first user device, the first experience template generated by:
determining first data indicative of a set of operations;
determining second data indicative of an order of execution of the set of operations;
determining timing data representing time intervals between individual changes of the respective plurality of user interactions;
generating interaction sequence data using the first data, the second data, the timing data, at least a portion of user interface settings information, and at least a portion of state information for one or more modules, wherein the interaction sequence data is representative of the interaction sequence; and
determining a first formatting associated with inputs from a first type of input/output device for association with the first experience template;
determining first user device data for the first user device;
accessing second user device data for a second user device;
generating, based at least in part on a correspondence between the first user device data and the second user device data, a second experience template configured for the second user device based at least in part on the first experience template, wherein the second experience template comprises the interaction sequence data;
determining a second formatting for the second experience template;
causing an operation of the set of operations to be executed, at least in part, using a second type of input/output device when implemented on the second user device;
determining that implementation of the first experience template causes an operation of the set of operations to be executed, at least in part, using a first type of input/output device when executed on the first user device;
determining that implementation of the second experience template causes the operation to be executed, at least in part, using a second different type of input/output device when executed on the second user device, wherein implementation of the first experience template or the second experience template results in a same final user interface setting or a same final module state as the interaction sequence;

providing the second experience template to the second user device; and causing the second experience template to be implemented on the second device by causing the set of operations to be executed in accordance with the order of execution and the respective time intervals.

11. The method of claim 10, wherein at least one of the first experience template or the second experience template comprises a respective one or more of a location, user device settings, module state information, or user interface settings.

12. The method of claim 10, wherein generating the second experience template comprises:

determining, based at least in part on the first user device data and the second user device data, input/output devices of the first user device and input/output devices of the second user device;

determining, based at least in part on the first user device data and the second user device data, one or more modules of the first user device and one or more modules of the second user device;

establishing, based at least in part on the first user device data and the second user device data, a correspondence between the input/output devices of the first and second user devices, wherein establishing a correspondence between the input/output devices comprises determining that functionality supported by the first type of input/output device is also supported by the second type of input/output device; and establishing, based at least in part on the first user device data and the second user device data, a correspondence between the one or more modules of the first and second user devices.

13. The method of claim 10, the one or more modules comprising an operating system module.

14. The method of claim 10, the one or more modules comprising a user interface module.

15. A method comprising:

capturing an interaction sequence resulting from a plurality of user interactions with a system;

retrieving user interface settings information;

retrieving state information for one or more modules executing on at least one processor;

determining first data indicative of a plurality of recorded changes over time to: a) one or more user interface settings, and b) one or more states of the one or more modules;

determining second data indicative of an order of execution of the plurality of recorded changes;

determining timing data representing time intervals between the respective plurality of recorded changes;

generating interaction sequence data using the first data, the second data, the timing data, at least a portion of user interface settings information, and at least a portion of state information for the one or more modules, wherein the interaction sequence data is representative of the interaction sequence;

determining a first formatting associated with inputs from a first type of input/output device for association with a first experience template;

generating the first experience template associated with the interaction sequence, the first experience template comprising at least the portion of the user interface settings information, at least the portion of the state information, and the interaction sequence data, wherein the first experience template has the first formatting;

implementing the first experience template by causing the plurality of recorded changes to be executed in accordance with the order of execution and with the respective time intervals;

causing a visualization of the plurality of recorded changes being executed and at least one of: a same final user interface setting or a same final module state as the interaction sequence; and generating a second experience template based at least in part on the first experience template, wherein the second experience template has a second formatting and causes an operation of the set of operations to be executed, at least in part, using a second type of input/output device when the second experience template is implemented on a second user device.

16. The method of claim 15, wherein the timing data is determined at least in part using time stamps associated with the individual changes of the plurality of recorded changes indicated by a clock of the system.

17. The method of claim 15, the one or more modules comprising one or more of an electronic book reader module configured to present electronic books, a player module configured to present audio or video media content, a word processing module configured to edit text, or an internet browser module configured to present information retrieved from a server.

18. The method of claim 15, the one or more modules comprising an operating system module.

19. The method of claim 15, the one or more modules comprising a user interface module.

* * * * *